US009262929B1

(12) United States Patent
Roy et al.

(10) Patent No.: US 9,262,929 B1
(45) Date of Patent: Feb. 16, 2016

(54) GROUND-SENSITIVE TRAJECTORY GENERATION FOR UAVS

(71) Applicant: Google Inc., Mountain View, CA (US)

(72) Inventors: Nick Roy, Newark, CA (US); Leila Takayama, Mountain View, CA (US); Mathias Samuel Fleck, Milpitas, CA (US); Roger William Graves, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/274,694

(22) Filed: May 10, 2014

(51) Int. Cl.
*G01C 23/00* (2006.01)
*G08G 5/00* (2006.01)

(52) U.S. Cl.
CPC .................................. *G08G 5/0034* (2013.01)

(58) Field of Classification Search
USPC .......................................................... 701/3–4
See application file for complete search history.

(56) References Cited

U.S. PATENT DOCUMENTS

| | | | | |
|---|---|---|---|---|
| 6,161,063 | A * | 12/2000 | Deker ................................ | 701/4 |
| 8,082,102 | B2 * | 12/2011 | Ravenscroft .................. | 701/301 |
| 8,639,396 | B1 | 1/2014 | Hirsch et al. | |
| 8,639,397 | B2 | 1/2014 | Verlut et al. | |
| 2005/0195096 | A1 * | 9/2005 | Ward et al. ............... | 340/995.14 |
| 2008/0183344 | A1 * | 7/2008 | Doyen et al. ........................ | 701/9 |
| 2010/0094485 | A1 * | 4/2010 | Verlut et al. ...................... | 701/3 |
| 2014/0018979 | A1 | 1/2014 | Goossen et al. | |

OTHER PUBLICATIONS

Mellinger et al., Minimum Snap Trajectory Generation and Control for Quadrotors, 2011 IEEE International Conference on Robotics and Automation (ICRA), pp. 2520-2525, Shanghai, China, May 9, 2011.
Richter et al., Polynomial Trajectory Planning for Aggressive Quadrotor Flight in Dense Indoor Environments, Proceedings of the International Symposium of Robotics Research (ISRR 2013), Singapore, 2013.
skypixel.org—Hello, everyone. Details are out about the new . . . , available at http://skypixel.org/, 4 pages, accessed on Apr. 7, 2014.

* cited by examiner

*Primary Examiner* — Yonel Beaulieu
(74) *Attorney, Agent, or Firm* — McDonnell Boehnen Hulbert & Berghoff LLP

(57) ABSTRACT

Embodiments described herein may help to automatically create flight plans that incorporate information regarding a number of different societal considerations. An illustrative computer-implemented method may involve receiving societal-consideration data for a plurality of geographic areas over which unmanned aerial vehicles (UAVs) are deployable. For a given geographic area from the plurality of geographic areas, the societal-consideration data may include one or more land-use indications for the geographic area that are indicative of a type of land use in the geographic area. The method may also involve, for each of one or more of the plurality of geographic areas: applying a cost function to the one or more land-use indications for the geographic area to determine a societal-consideration cost of UAV flight over the geographic area; and sending an indication of the determined societal-consideration cost to a computer-based flight planner.

19 Claims, 11 Drawing Sheets

| LAND-USE ID | NAME | LOCATION | TYPE | GEO. AREA | TIMEFRAME |
|---|---|---|---|---|---|
| A | Apt. Complex 1 | LAT1, LON1 | Perm. Dense Pop. | 1 | Always |
| B | Parade Route 1 | LAT2, LON2 | Temp. Dense Pop. | 2 | MM/DD Morning |
| C | Sports Arena 1 | LAT3, LON3 | Temp. Dense Pop. | 3 | MM/DD Afternoon |
| D | School 1 | LAT4, LON4 | School | 4 | School hours |
| E | School 2 | LAT5, LON5 | School | 3 | School hours |
| F | Hospital 1 | LAT6, LON6 | Health Center | 4 | Always |
| G | Prison 1 | LAT7, LON7 | Perm. Dense Pop. | 2 | Daytime |
| H | Retirement Cmty. 1 | LAT8, LON8 | Perm. Dense Pop. | 1 | Always |
| I | Meditation Ctr. 1 | LAT9, LON9 | Noise-limited Area | 2 | Daytime |
| J | Zoo 1 | LAT10, LON10 | Noise-limited Area | 4 | Always |
| K | Park 1 | LAT11, LON11 | Outdoor Space | 3 | Park hours |
| L | Park 2 | LAT12, LON12 | Outdoor Space | 1 | Park hours |
| M | Household 1 | LAT13, LON13 | User-Provided Data | 2 | Always |
| N | Business 1 | LAT14, LON14 | User-Provided Data | 1 | Business hours |

FIGURE 9

| GEO. AREA | SOCIETAL-CONSIDERATION COST | MIN. DISTANCE |
|---|---|---|
| 1 | A*W1 + H*W1 + L*W5 + N*W6 = 4 | 40 meters |
| 2 | B*W1 + G*W1 + I*W4 + M*W6 = 5 | 50 meters |
| 3 | C*W1 + E*W2 + K*W5 = 2 | 20 meters |
| 4 | D*W2 + F*W3 + J*W4 = 3 | 30 meters |
| 5 | 0 | 1 meter |

GROUND-SENSITIVE TRAJECTORY GENERATION FOR UAVS

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Embodiments described herein may relate to automatically creating flight plans for UAVs, and in particular, to automatically creating flight plans that dynamically take various societal considerations into account. For example, when a UAV is flying near certain populations or regions of a community, systems and methods described herein may help a computer-based flight planner to determine flight plans that avoid flying over temporarily or permanently dense population areas, or areas that would be especially disturbed by noise. Similarly, the systems and methods described herein may help a computer-based flight planner to determine flight plans that are responsive to personal preferences regarding UAV flight over particular areas.

In one aspect, an exemplary computer-implemented method may involve receiving societal-consideration data for a plurality of geographic areas over which unmanned aerial vehicles (UAVs) are deployable. For a given geographic area from the plurality of geographic areas, the societal-consideration data includes one or more land-use indications for the geographic area that are indicative of a type of land use in the geographic area. The method also involves, for each of one or more of the plurality of geographic areas: applying a cost function to the one or more land-use indications for the geographic area to determine a societal-consideration cost of UAV flight over the geographic area; and sending an indication of the determined societal-consideration cost to a computer-based flight planner.

In a further aspect, a non-transitory computer readable medium having stored therein instructions that are executable to cause a computing device to perform functions is provided. The functions include receiving societal-consideration data for a plurality of geographic areas over which UAVs are deployable. For a given geographic area from the plurality of geographic areas, the societal-consideration data includes one or more land-use indications for the geographic area that are indicative of a type of land use in the geographic area. The functions also include, for each of one or more of the plurality of geographic areas, applying a cost function to the one or more land-use indications for the geographic area to determine a societal-consideration cost of UAV flight over the geographic area.

In another aspect, a computing device including a processor and a computer-readable medium is provided. The computer-readable medium includes stored instructions that are executable to cause the computing device to perform functions, and the functions include receiving societal-consideration data for a plurality of geographic areas over which UAVs are deployable. For a given geographic area from the plurality of geographic areas, the societal-consideration data includes one or more land-use indications for the geographic area that are indicative of a type of land use in the geographic area. The functions also include, for each of one or more of the plurality of geographic areas, applying a cost function to the one or more land-use indications for the geographic area to determine a societal-consideration cost of UAV flight over the geographic area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9 is a table conceptually illustrating example societal-consideration data, according to an example embodiment.

FIG. 10 is a table conceptually illustrating example societal-consideration costs, according to an example embodiment.

DETAILED DESCRIPTION

Figure 1:
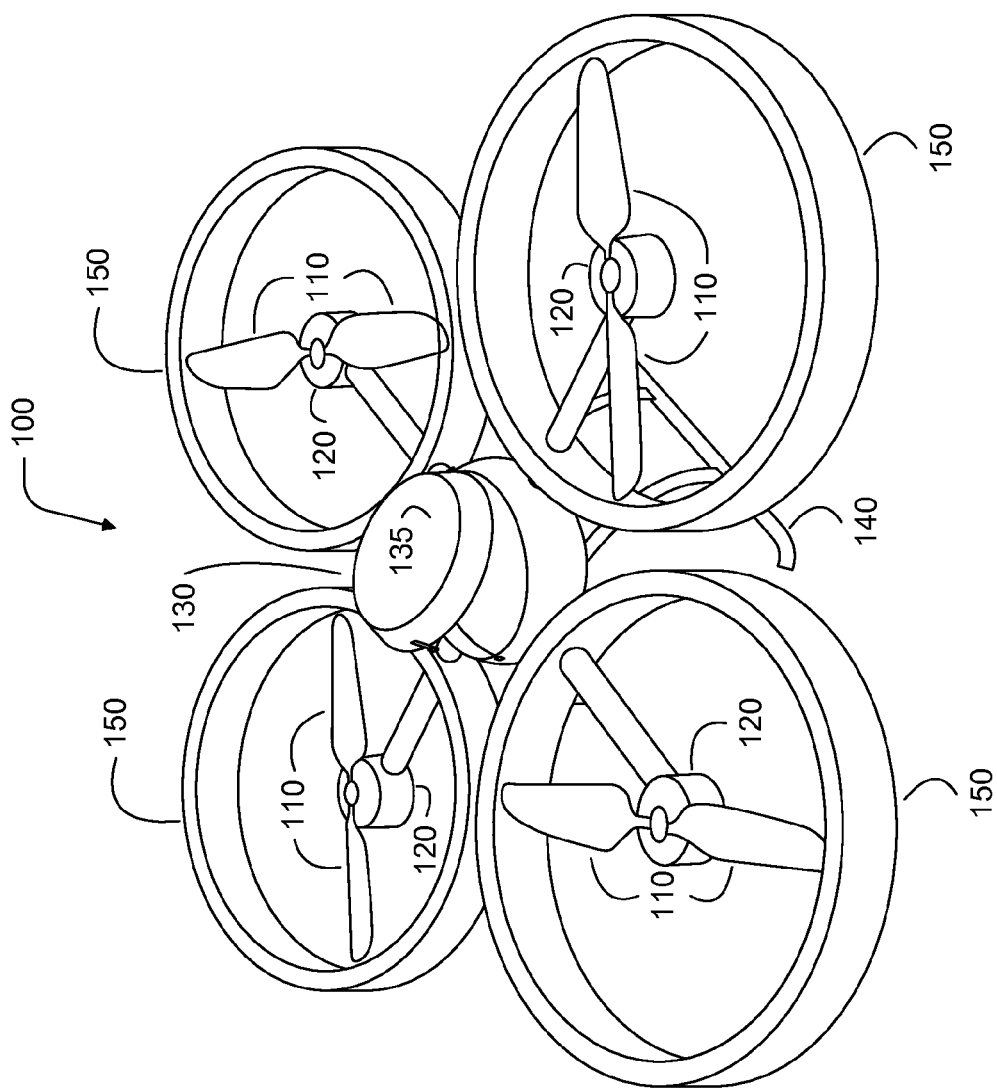
FIGS. 1, 2, 3A, and 3B are simplified illustrations of unmanned aerial vehicles, according to example embodiments.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. OVERVIEW

Embodiments described herein may relate to automatically creating flight plans for UAVs, and in particular, to automatically creating flight plans that dynamically take various societal considerations into account. For example, when a UAV is flying near certain populations or regions of a community, systems and methods described herein may help a computer-based flight planner to determine flight plans that avoid flying over temporarily or permanently dense population areas, or areas that would be especially disturbed by noise. Similarly, the systems and methods described herein may help a computer-based flight planner to determine flight plans that are responsive to personal preferences regarding UAV flight over particular areas.

In an illustrative embodiment, a computing device may receive societal-consideration data for a plurality of geographic areas over which UAVs are deployable. In one instance, each geographic area may be an area corresponding to a building or outdoor space. In another instance, each geographic area may correspond to a predetermined region within a larger area. For example, a city may be represented by a grid having a plurality of cells, and each cell of the grid may represent a geographic area. The societal-consideration data may include information that is indicative of types of land-use in different areas. In particular, for a given geographic area from the plurality of geographic areas, the societal-consideration data may include one or more land-use indications that are indicative of a type of land use in the geographic area, for example.

The societal-consideration data may include a variety of types of land-use indications. As one example, a land-use indication may be an indication of a geographic area or a portion of a geographic area having a permanent population density that is greater than a population threshold (e.g., an indication of an apartment complex in the geographic area having a population density greater than a threshold). As another example, a land-use indication may be an indication of the location and date of a temporary public gathering (e.g., a parade route, sporting event, or area with high road congestion). As still another example, a land-use indication may indicate a building or outdoor space that is vulnerable to UAV flight (e.g., a hospital, park, zoo, or meditation center). As yet another example, a land-use indication may include user-provided data indicating personal preferences for land use (e.g., a preference that UAV travel should be constrained). Various other examples are disclosed herein.

Given the received societal-consideration data, a computing device may determine a societal-consideration cost of UAV flight over various geographic areas from the plurality of geographic areas. In one example, for each of one or more geographic areas, the computing device may apply a cost function to the one or more land-use indications for the geographic area to determine a societal-consideration cost of UAV flight over the geographic area. For instance, the cost function may apply a corresponding predetermined weight to each of the one or more land-use indications for the geographic area to determine the societal-consideration cost. Each predetermined weight may reflect the level of need to respect the particular type of land use. The determined societal-consideration costs may then be provided as input for a computer-based flight planner.

In one example, the computer-based flight planner may determine a particular flight plan for a UAV using the determined societal-consideration costs. For example, the computer-based flight planner may execute an algorithm that prefers to schedule UAV travel in low societal-consideration cost areas rather than high societal-consideration cost areas. Furthermore, the algorithm may consider a predetermined importance measure of the flight when determining the flight plan. For instance, delivery of emergency medical equipment may override avoidance of flying over a zoo; however, a low-priority UAV returning to its base station might take a longer and far less efficient path over a nearby body of water to avoid flying over even minor social-consideration cost areas.

Additionally, a flight plan determined by the computer-based flight planner may indicate a minimum distance from obstacles for the UAV to maintain during one or more segments of the flight. The minimum distance may be proportional to the societal-consideration cost of an area in which the UAV is flying over. As a result, the flight plan may desirably enhance the perceived safety of UAVs, e.g., by turning earlier than necessary in order to demonstrate clear awareness to bystanders of possible risks, for example.

In a further aspect, the computing device may gather or collect societal-consideration data from one or more databases. For example, the computing device may access a census database to determine population densities of different areas. As another example, the computing device may access event planning databases to determine information regarding temporary public gatherings. As still another example, the computing device may receive feedback from a UAV travel-feedback database that stores user-provided data regarding personal preferences for UAV flight in different areas. Additionally, the computing device may receive societal-consideration data that indicates a plurality of predetermined weights corresponding to different types of land use.

It should be understood that the above embodiments, and other embodiments described herein, are provided for explanatory purposes, and are not intended to be limiting.

Further, the term "societal-consideration data" as used herein should be understood to include data related to societal considerations that may influence where and/or how UAVs travel, such as one or any combination of information regarding temporary or permanent densely populated areas, information regarding vulnerable populations (e.g., schools, hospitals, prisons, retirement communities, etc.), information regarding areas that would be especially disturbed by the noise of UAV travel, information regarding areas that should be avoided or preferred for safety reasons, and information regarding personal preferences for UAV travel (e.g. user-provided feedback), as well as information regarding weights corresponding to different types of land use that is used to determine societal-consideration costs of flying over respective geographic areas.

II. ILLUSTRATIVE UNMANNED VEHICLES

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, Immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
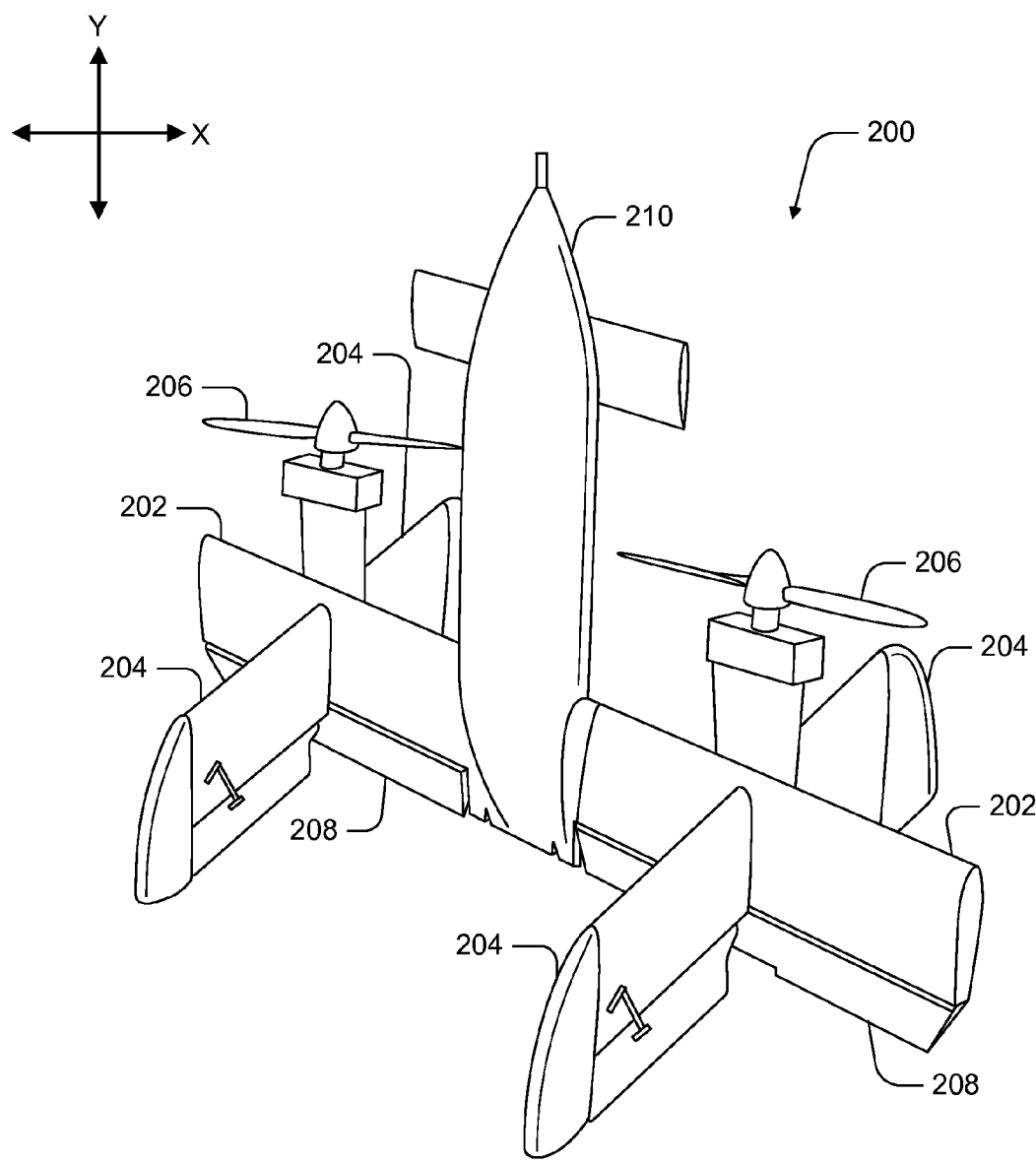

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
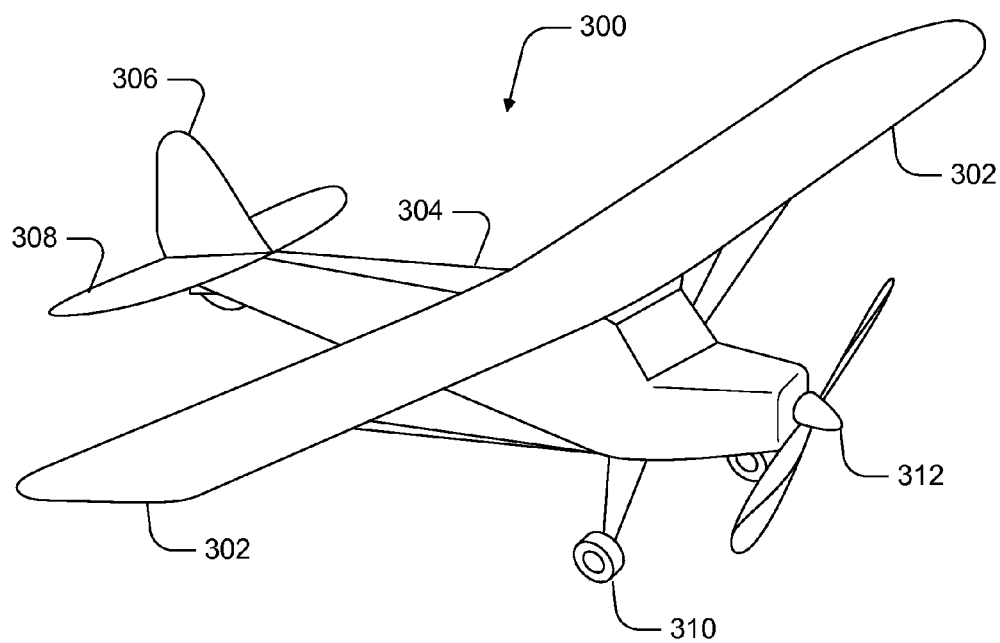

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
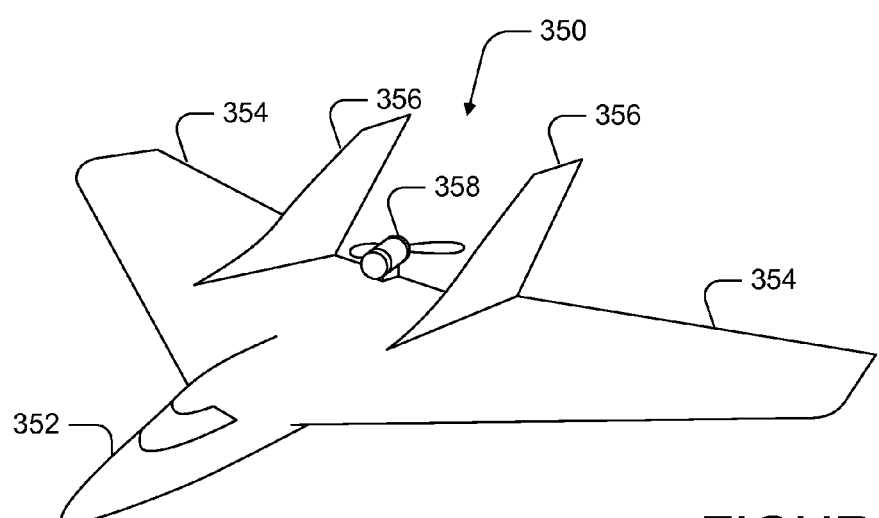

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. ILLUSTRATIVE UAV SYSTEMS

Figure 4:
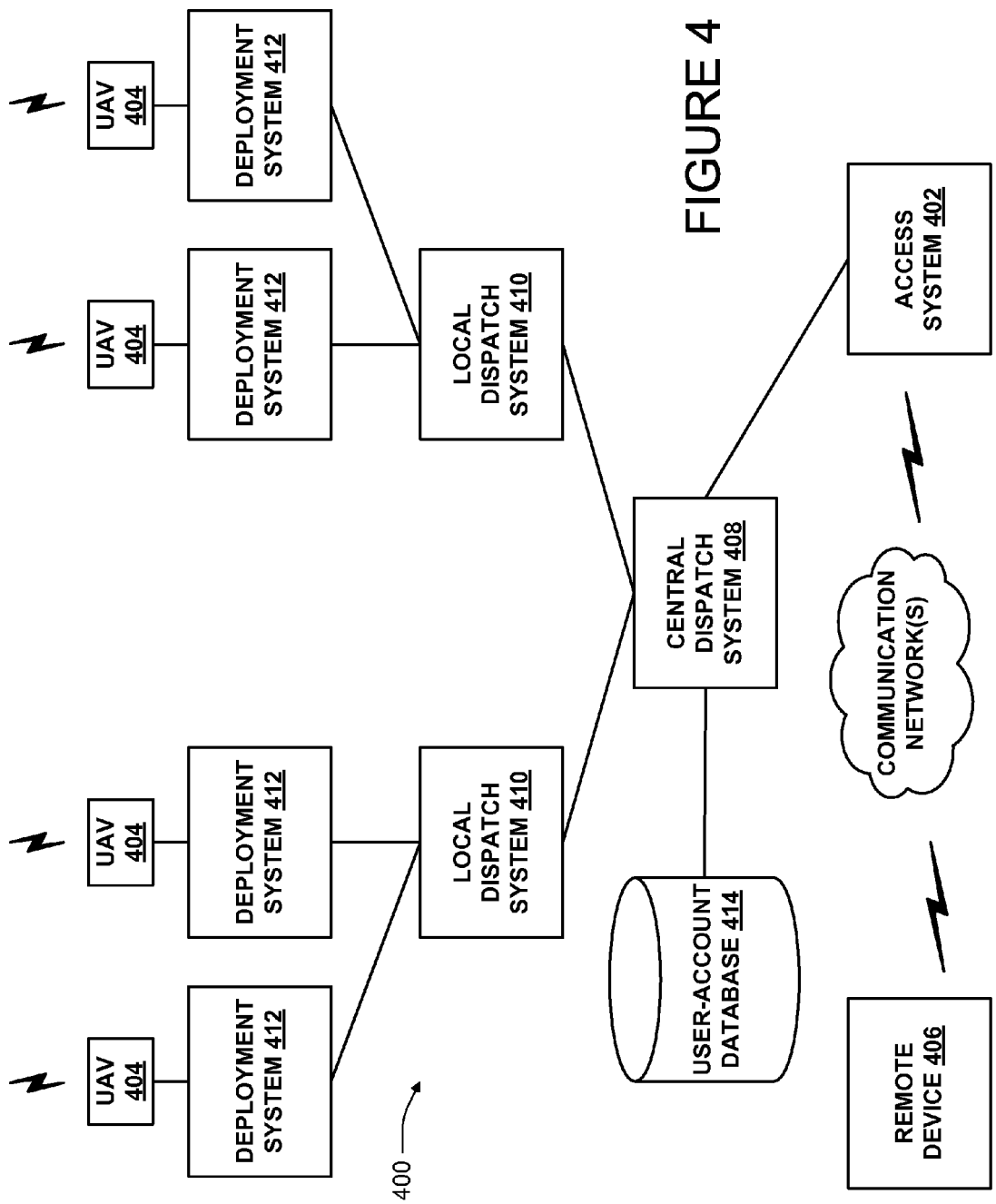
FIG. 4 is a simplified block diagram illustrating a network of unmanned aerial vehicles, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404. In some embodiments, dispatch of UAVs 404 may additionally or alternatively be accomplished via one or more automated processes.

Further, an access system 402 may provide for remote operation of a UAV. For instance, an access system 402 may allow an operator to control the flight of a UAV via user interface (UI). As a specific example, an operator may use an access system to dispatch a UAV 404 to deliver a package to a target location, or to travel to the location of a medical situation with medical-support items. The UAV 404 may then autonomously navigate to the general area of the target location. At this point, the operator may use the access system 402 to take over control of the UAV 404, and navigate the UAV to the target location (e.g., to a particular person to whom a package is being sent). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support.

A remote device 406 may take various forms. Generally, a remote device 406 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

Further, a remote device 406 may be configured to communicate with access system 402 via one or more types of communication network(s). For example, a remote device 406 could communicate with access system 402 (or via a human operator of the access system) by placing a phone call over a POTS network, a cellular network, and/or a data network such as the Internet. Other types of networks may also be utilized.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone).

In some embodiments, a remote device 406 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

As noted, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured for.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could request medical support directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. ILLUSTRATIVE COMPONENTS OF A UAV

Figure 5:
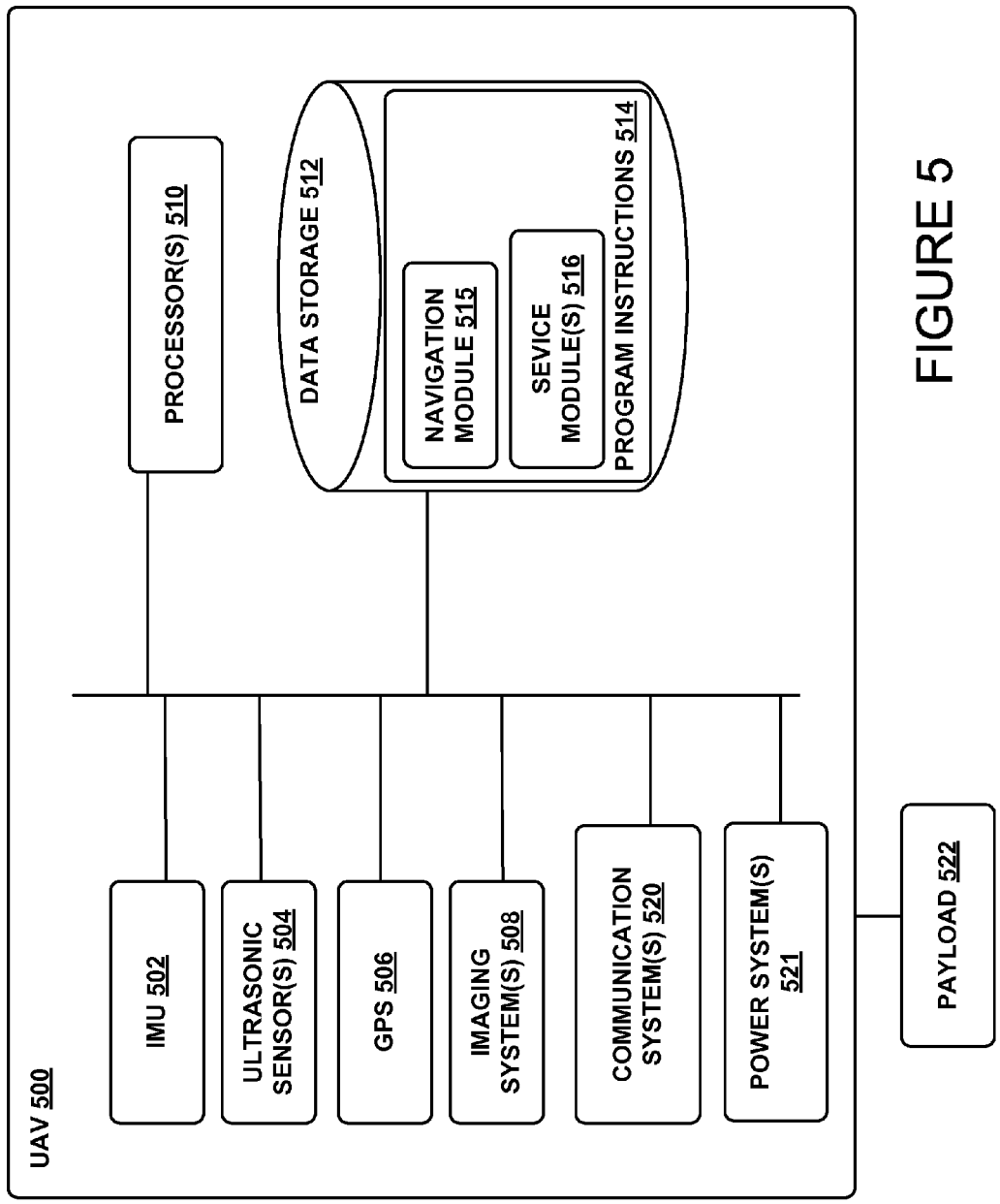
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system(s) 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAV's environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 500 has navigated to the general area of the person or device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a Wi-Fi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 522 of a given UAV 500 may include or take the form of a "package" designed to transport medical-support items to a target delivery location. For example, a medical-support UAV may include a package with one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc. In other cases, a UAV 500 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

F. Service Modules

As noted above, UAV 500 may include one or more service modules 516. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a service module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

V. ILLUSTRATIVE SYSTEM

Figure 6:
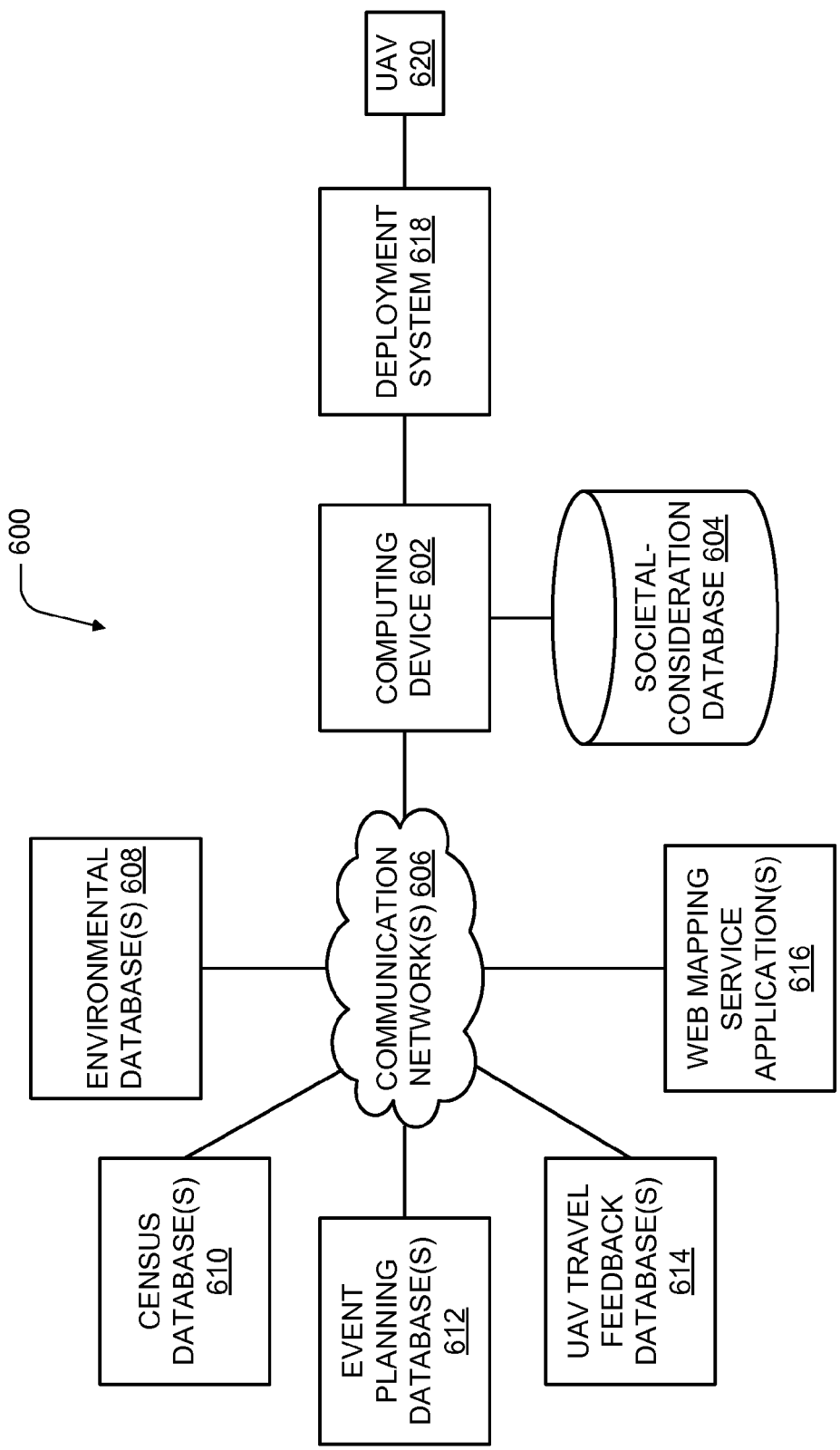
FIG. 6 is a simplified block diagram illustrating an example system, according to an example embodiment.

As noted above, the methods and systems provided herein may enable a computing device to automatically create flight plans that dynamically incorporate information regarding a number of different societal considerations. FIG. 6 is a simplified block diagram illustrating an example system 600, according to an example embodiment.

As shown in FIG. 6, the example system 600 may include a computing device 602 that is configured to communicate with a societal-consideration database 604. Additionally, the computing device 602 may be configured to communicate with a number of other databases using one or more communication networks 606. In particular, computing device 602 may be communicate with one or more environmental databases 608, one or more census databases 610, one or more event planning databases 612, one or more UAV travel-feedback databases 614, and one or more web mapping service applications 616. Furthermore, computing device is configured to communicate with a deployment system 618, which in turn is configured to deploy a UAV 620.

Computing device 600 may be configured to receive societal-consideration data for a plurality of geographic areas over which UAVs are deployable. For instance, computing device 600 may receive societal-consideration data from societal-consideration database 604. Alternatively or additionally, computing device 600 may acquire societal-consideration data by accessing any of the census databases 610, event planning databases 612, UAV travel-feedback databases 614, and/or web mapping service applications 616. In line with the discussion above, the societal-consideration data may include one or more land-use indications for particular geographic areas. In some examples, the land-use indications may be indicative of public enjoyment derived from land use in a plurality of geographic areas in which service is provided by a fleet of UAVs. For instance, a land-use indication may be indicative of a type of land use in a geographic area, a geographic area having a permanent or temporary population density that is greater than a population threshold, or personal preferences for land use in a geographic area.

Examples of land-use indications include: indications of a type of land use, such as category describing the character of the land or the type of activity the land is used for (e.g., rural, urban, commercial, residential, agricultural, public access, developed, undeveloped, incorporated, unincorporated, etc.); indications of temporary or permanent densely populated areas, such as apartment complexes, parade routes, sporting arenas, areas of high road congestion; indications of locations of vulnerable populations, such as schools, hospitals, prisons, retirement communities, parks, or other areas where a large number of members of the public may gather; indications of locations especially susceptible to noise, such as meditation centers, zoos, etc.; and indications of user-provided data regarding personal preferences of land use. One example of a personal preference regarding land use is a resident's preference (e.g., a preference of a homeowner or business owner) that UAV travel should be constrained above their residence. Another example of a personal preference is a preference of an individual that UAV travel should be constrained in a particular public location (e.g., a park).

In some examples, a land-use indication may include a location of the land use (e.g., latitude and longitude coordinate). Optionally, the land-use indication may also specify a size or area of the land-use (e.g., a number of acres or square meters). In other examples, the land-use indication may specify a timeframe during which the land use occurs. For example, if the land-use indication is a parade route, the land-use indication may identify the date and time of the parade. As another example, if the land-use indication identifies an operation of a business, the land-use indication may also specify business hours during which the business operates.

The one or more census databases 610 may store information regarding populations or population densities of different areas. For instance, the census databases 610 may identify populations of cities, municipalities, towns, suburbs, and/or townships. Thus, the computing device 600 may access a census database to determine information regarding populations or population densities.

The one or more event planning databases 612 may store information regarding temporary public gatherings. For instance, an event planning database for a city may identify the time, date, and/or location of a parade. As another example, an event planning database may identify street and sidewalk closures in a city due to special events (e.g., festivals). Thus, the computing device 600 may access an event planning database to determine information regarding temporary public gatherings.

The one or more UAV travel-feedback databases 614 may store user-provided data regarding personal preferences for land use. As one example, a UAV travel-feedback database may receive concerns or complaints about UAV flight. For instance, a user may request that UAV travel be constrained in a particular area where the user resides or conducts business, or in a public space such as a park. Optionally, a personal preference may specify a time or day(s) when UAV travel should be constrained. Furthermore, a personal preference may indicate whether the user is a resident or non-resident of the particular area.

In one example, a user may specify personal preferences for UAV flight using a user interface of a computing device. For instance, the computing device may provide a map-based user interface. Using the map-based UI, a user may identify their backyard, e.g., by drawing a circle around or otherwise selecting an area that the user would like UAVs to avoid.

A UAV travel-feedback database may also aggregate personal preferences for different areas. For example, a UAV travel-feedback database may store information regarding how many complaints regarding UAV flight have been received for a particular geographic area or section of a geographic area. In one instance, a UAV travel-feedback database may allow payment to increase the amount of weight given to a user's personal preference. Thus, the UAV travel-feedback database may also store information regarding an amount of money received for a particular geographic area or section of a geographic area. Thus, the computing device 600 may access a UAV travel-feedback database to determine user-provided data regarding personal preferences for land use.

In some examples, the UAV travel-feedback database may store societal-consideration data that is implicitly provided by users via one or more services. For instance, if a number of users have a baseball game scheduled on their calendar at a particular park, the UAV travel-feedback may determine, based on the calendar indications, that UAVs should try to avoid the park during the time that the game is scheduled. As another example, if a number of users post to social network accounts and/or microblogs to complain about UAV flight in a particular area, the UAV travel-feedback database may also store information indicating that UAVs should avoid flying near the particular area. In such examples, data implicitly provided by users may only be used with the user's permission. In other words, data may only be collected from other services if the user has opted-in to allow the data to be provided to the UAV travel-feedback database. The user may be able to opt-in or opt-out of allowing their data to be used by the UAV travel-feedback database. In one example, a user may be presented with an option to allow their calendar data or social-network data to be logged but not shared with others users. For instance, the collecting of information may be done while respecting the privacy of a user or masking the identity of the user.

The one or more web mapping service applications 616 may store information regarding the locations of different land uses. For instance, a web mapping service application may store the location of a plurality of businesses, public spaces, and residential homes. In one example, the computing device 600 may collect semantic data from a web mapping service application to identifying one or more land uses present in a given geographic area. In some examples, a web mapping service application may also provide real-time or historical traffic information. For example, a web mapping service application may provide real-time traffic alerts regarding high road congestion. As another example, a web mapping service application may provide information about areas that typically experience high road congestion, as well as the time(s) when the road congestion occurs. Thus, the computing device 600 may access a web mapping service application to determine information regarding the locations of different land uses or traffic information.

Further in line with the discussion above, computing device 600 may be configured to assign weights to different land-use indications in accordance with rules for avoidance of different types of land use. As one example, the computing device 600 may be configured to apply a cost function to one or more land-use indications for a geographic area to determine a societal-consideration cost of UAV flight over the geographic area. For instance, the computing device 600 may use the cost function to apply corresponding predetermined weights to each of the land-use indications for the geographic area. In some examples, the predetermined weights may be part of the societal-consideration data received by the computing device 600 or stored in the societal-consideration database 604.

According to one example, predetermined weights may be associated with different types of land use. For example, a first weight may be associated with indications of temporary or permanent densely populated areas (e.g., areas having a population density that is greater than a threshold). Similarly, a second weight may be associated with areas that may be particularly vulnerable to UAV flight, such as schools, hospitals, and other areas. Depending on the desired implementation, the first weight may be greater than, less than, or equal to the second weight. Furthermore, additional types of land use may have different predetermined corresponding weights.

In one specific implementation, a weight associated with user-provided data for a particular geographic area may be proportional to the number of preferences received for a particular geographic area. For example, if multiple complaints regarding UAV travel in a particular geographic area have been received from different people, the weight applied to the user-provided data for the geographic area may be greater than a weight applied to a geographic area having less user-provided data. Similarly, in another example implementation, a weight associated with user-provided data for a particular geographic area may be proportional to an amount of money received for a particular geographic area. For instance, if more than a threshold amount of money is received for a particular geographic area, the weight applied to the user-provided data for the geographic area may be greater than a weight applied to a geographic area having less money received.

In some examples, the weight applied to different land-use indications may vary depending on one or more factors. For example, if a particular type of land-use varies based on the time of day, the weight applied to the land-use indication may vary based on the time of day. As an example, during school hours, a first weight may be applied to a land-use indication representing the school; however, outside of school hours, a second weight that is less than the first weight may be applied to the land-use indication. Similarly, the weight applied to a land-use indication may vary based on the day of the week, whether a day is holiday, the season of the year, or other factors.

Thus, the predetermined weights may function to increase the societal-consideration cost of flying over different areas depending on the particular type of land use in a geographic area, and optionally, different characteristics of the land use.

Additionally, the computing device 600 may be configured to determine a flight plan for a particular UAV using the determined societal-consideration costs. For example, the computer-based flight planner may execute an algorithm that prefers to schedule UAV travel in low societal-consideration cost areas rather than high societal-consideration cost areas.

In one instance, the computer-based flight planner may perform a rapidly exploring random tree (RRT) algorithm, or other similar algorithm, to generate a plurality of trajectories between a starting point and an ending point. The computer-based flight planner may then compute a societal-consideration cost for various candidate trajectories based on the societal-consideration costs of the different areas over which the trajectory would take a UAV. And the computer-based flight planner may then select a trajectory having a minimum societal-consideration cost.

Additionally, in some examples, the computing device 600 may consider a predetermined importance measure of the flight when determining the flight plan. The predetermined importance measure may be indicative of an acceptable amount of societal-consideration costs to be incurred during flight of the particular UAV. Therefore, in some examples, the computing device may select the most efficient path (e.g., shortest route) having a societal-consideration cost that is less than an acceptable amount of societal-consideration costs, rather than selecting a trajectory having the minimum societal-consideration cost. For instance, delivery of emergency medical equipment may override avoidance of flying over a zoo; however, a low-priority UAV returning to its base station might take a longer and far less efficient path over a nearby body of water to avoid flying over even minor social-consideration cost areas.

In another instance, the computer-based flight planner may formulate the determined societal-consideration costs into a loss function. The loss function may map a trajectory (e.g., a series of waypoints) to a real number that intuitively represents a "cost" associated with the trajectory. For instance, the loss function may penalize the proximity to a nearest land-use having a societal-consideration cost that is greater than zero. The computer-based flight planner may then solve an optimization problem to determine a trajectory having the minimum cost, and output that trajectory as the flight plan for the UAV.

Further, the computing device 600 may access the one or more environmental databases 608 to determine additional information that should be taken into consideration when determining a flight plan for a UAV. The one or more environmental databases 608 may store information regarding areas where UAV travel should be constrained due to environmental considerations. For instance, the environmental databases 608 may identify weather forecasts and/or migratory bird paths that should be taken into consideration when determining flight plans. Thus, computing device 600 may access the one or more environmental databases 608 to determine information regarding environmental considerations affecting generation of flight plans.

In some instances, a flight plan determined by the computer-based flight planner may indicate a minimum distance from obstacles for the UAV to maintain during one or more segments of the flight. The minimum distance may be proportional to the societal-consideration cost of an area in which the UAV is flying over. For example, a UAV may be configured to keep away from obstacles by at least a first distance when flying over high societal-consideration cost areas, but the UAV may be permitted to fly closer to obstacles when flying over rural areas having little or no social-consideration costs. As a result, the flight plan may desirably enhance the perceived safety of UAVs, e.g., by turning earlier than necessary in order to demonstrate clear awareness of possible risks, for example.

The computing device 600 may also provide a determined flight plan to the deployment system 618. The deployment system 618 may take various forms. In general, a deployment system may take the form of or include a system for physically launching UAV 620. Further, deployment system 618 may be configured to launch one particular, such as UAV 620, or to launch multiple UAVs.

UAV 620 may take various forms. For example, UAV 620 may be a UAV such as those illustrated in FIGS. 1, 2, 3A, and 3B. However, system 600 may also utilize other types of UAVs without departing from the scope of the invention.

The above description of the computing device 600 is not meant to be limiting. In other examples, functions of the computing device 600 may be distributed across multiple computing devices. Furthermore, additional functionality of the computing device 600 is described below with reference to FIGS. 7-11.

VI. ILLUSTRATIVE COMPONENTS OF AN EXAMPLE COMPUTING DEVICE

Figure 7:
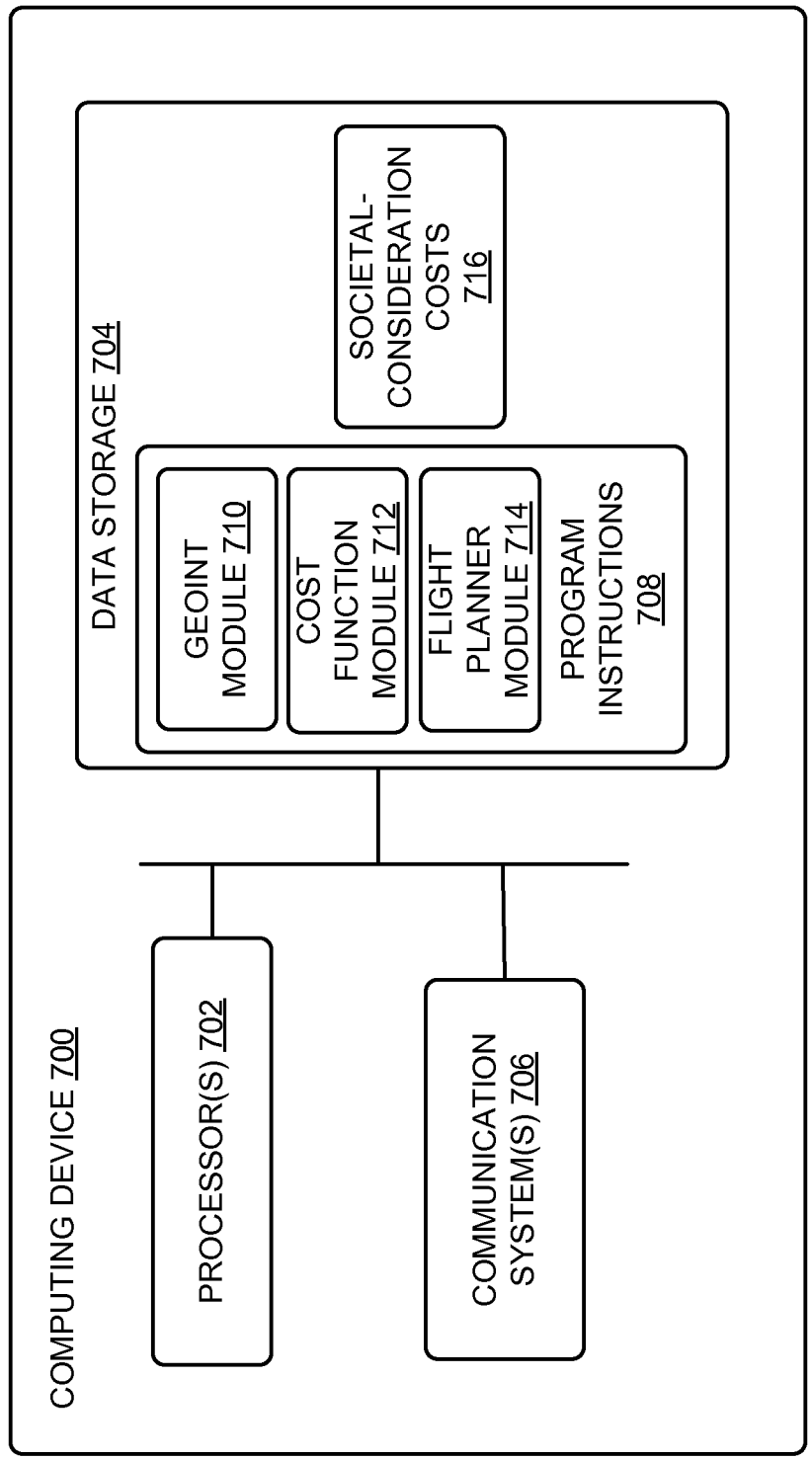
FIG. 7 is a simplified block diagram illustrating components of an example computing device, according to an example embodiment.

FIG. 7 is a simplified block diagram illustrating components of an example computing device 700, according to an example embodiment. By way of example, computing device 700 may be the computing device 602 of FIG. 6.

As shown in FIG. 7, computing device 700 includes one or more processors 702, a data storage 704, and one or more communication systems 706.

A processor 702 may be a general-purpose processor or a special purpose processor (e.g., digital signal processors, application specific integrated circuits, etc.). The one or more processors 702 can be configured to execute computer-readable program instructions 708 that are stored in the data storage 704 and are executable to provide the functionality of a computing device described herein.

The data storage 704 may include or take the form of one or more computer-readable storage media that can be read or accessed by at least one processor 702. The one or more computer-readable storage media can include volatile and/or non-volatile storage components, such as optical, magnetic, organic or other memory or disc storage, which can be integrated in whole or in part with at least one of the one or more processors 702. In some embodiments, the data storage 704 can be implemented using a single physical device (e.g., one optical, magnetic, organic or other memory or disc storage unit), while in other embodiments, the data storage 704 can be implemented using two or more physical devices.

As noted, the data storage 704 can include computer-readable program instructions 708. As such, the data storage 704 may include program instructions to perform or facilitate some or all of the computing device functionality described herein. For instance, in the illustrated embodiment, program instructions 708 include a geospatial intelligence (GEOINT) module 710, a cost function module 712, and a flight planner module 714.

In line with the discussion above, the GEOINT module 710 may provide functionality that allows the computing device 700 to determine locations where UAV travel should be constrained based on a type of land use at the location. In particular, the GEOINT module 710 may provide functionality to determine societal-consideration data.

In one example, the GEOINT module 710 may identify the locations of any of a plurality of predetermined types of land use within a plurality of geographic areas in which UAVs are deployable. By way of example, the GEOINT module 710 may gather semantic data about the type of land-use at various locations. For instance, the GEOINT module 710 may query a web mapping service application to identify the locations of schools, hospitals, parks, apartment complexes, retirement communities, zoos, museums, prisons, shopping malls, and other possible types of land use within the plurality of geographic areas. The web mapping service application may return the known locations (e.g., latitude and longitude coordinates) of any of the predetermined types of land use that exist within the plurality of geographic areas. In some examples, the GEOINT module 710 may then classify each land-use indication as belonging to a particular geographic area of the plurality of geographic areas. For example, based on the latitude and longitude coordinates of a particular land use, the GEOINT module 710 may determine that the land use is located within a particular geographic area.

Additionally or alternatively, the GEOINT module 710 may be configured to access one or more census databases, event planning databases, and UAV travel-feedback databases to determine additional land-use indications.

Further in line with the discussion above, the cost function module 712 may provide functionality that allows the computing device 700 to determine the societal-consideration cost of each of one or more geographic areas from the plurality of geographic areas. In practice, the cost function module 712 may provide functionality to apply a cost function to one or more land-use indications for a geographic area to determine the societal-consideration cost of UAV flight over the geographic area.

As discussed above, the computing device 700 may use the cost function to apply a corresponding predetermined weight to each of the one or more land-use indications for the geographic area. For instance, depending on the type of land use, each land-use indication for the geographic area may be multiplied by a respective weight which corresponds to the level of need to avoid flying over the area to respect social and privacy considerations. If a particular type of land use is highly protected, a large weight may be applied to land-use indications of that particular type in order to increase the cost of flying over areas where the particular type of land use is present. However, if other types of land use are less protected, a smaller weight may be applied land-use indications of the other type of land use.

In other examples, the cost function module 712 may treat each identified land-use indication equally by applying the same weight to each land-use indication. In other words, the societal-consideration cost for a particular geographic area may simply be proportional to the number of land-use indications identified for the particular geographic area.

After determining the societal-consideration costs for the one or more geographic areas, the computing device may store determined societal-consideration costs 716 in the data storage 704. Because the societal-consideration costs 716 may be dependent on the time of day or day of the week, the cost function module 712 may periodically (or in response to receiving a request for updated societal-consideration costs) determine updated societal-consideration costs 716 to replace the societal-consideration costs 716. Alternatively, the computing device may maintain multiple instances of societal-consideration costs 716 in the data storage 704 that correspond to different times of day or days of the week.

The flight planner module 714 may use determined societal-consideration costs for different geographic areas to create a flight plan for a particular UAV. In line with the discussion above, in some examples, the flight planner module 714 may perform a rapidly exploring random tree (RRT) algorithm, or other similar algorithm, to generate a plurality of trajectories between a starting point and an ending point. The flight planner module 714 may then compute a societal-consideration cost for various candidate trajectories based on the societal-consideration costs of the different areas over which the trajectory would take a UAV. And the flight planner module 714 may then select a trajectory having a minimum societal-consideration cost.

In other examples, the flight planner module 714 may formulate the determined societal-consideration costs into a loss function. The loss function may map a trajectory (e.g., a series of waypoints) to a real number that intuitively represents a "cost" associated with the trajectory based on the societal-consideration costs of the geographic areas under the trajectory. In such an example, the flight planner module 714 may solve an optimization problem to determine a trajectory having the minimum cost, and output that trajectory as the flight plan for the UAV.

As discussed above, the flight planner module 714 may also provide functionality to determine environmental considerations and/or an importance measure of a flight when determining the flight plan. Furthermore, the flight planner module 714 may consider kinematic restraints of the UAV and locations of known obstacles (e.g., buildings, trees, mountains, etc.) when determining a flight plan.

Finally, the one or more communication systems 706 may include one or more wireless interfaces and/or one or more wireline interfaces, which allow computing device 700 to communicate via one or more networks. Such wireless interfaces may provide for communication under one or more wireless communication protocols, such as Bluetooth, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In other examples, the computing device 700 may include more or less components. Thus, the illustrated computing device 700 is not meant to be limiting.

VII. ILLUSTRATIVE METHODS

Figure 8:
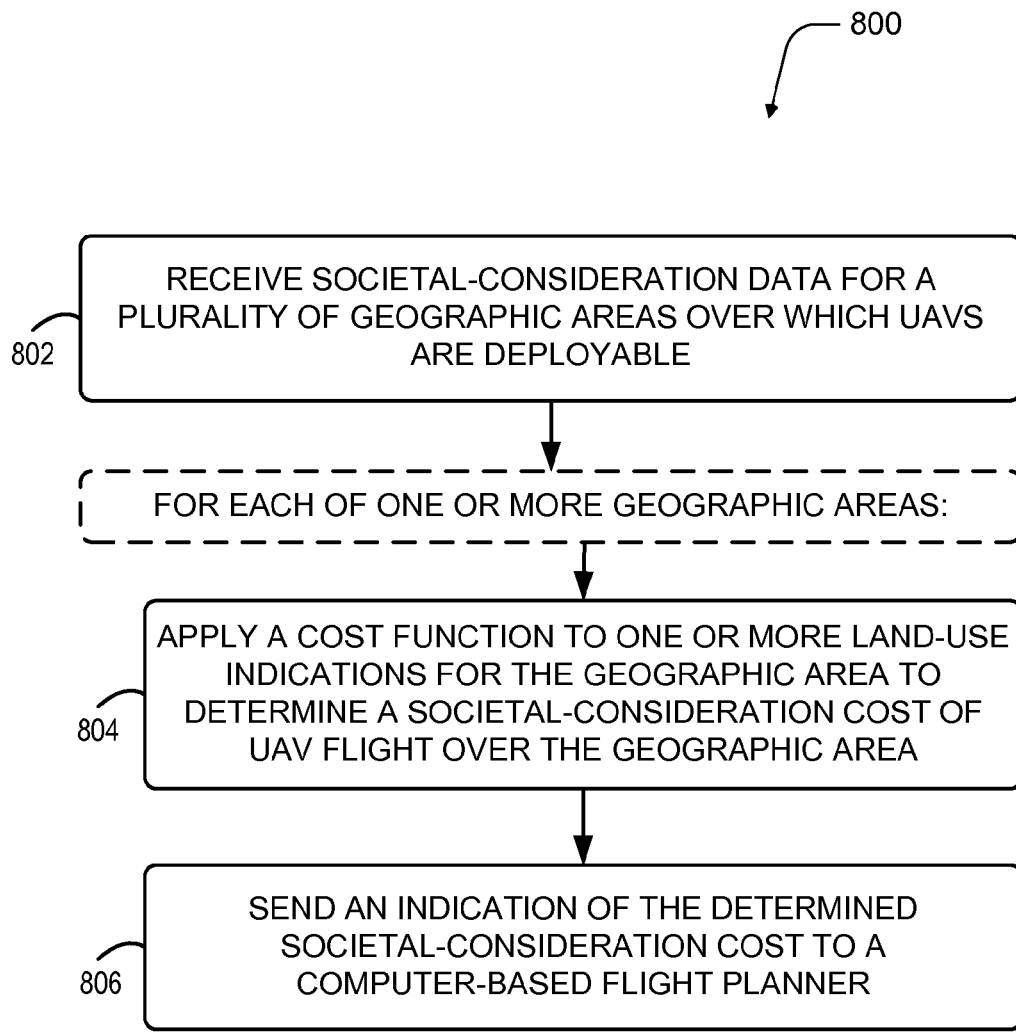
FIG. 8 is a flow chart illustrating an example method 600, according to an example embodiment.

FIG. 8 is a flow chart illustrating an example method 800, according to an example embodiment. Illustrative methods, such as method 800, may be carried out in whole or in part by a computing device, such as by the computing device 700 of FIG. 7 or one or more of the components of the computing device 700 shown in FIG. 7. For simplicity, method 800 may be described generally as being carried out by a single computing device. However, it should be understood that example methods, such as method 600, may be carried out by other entities or combinations of entities (i.e., by other computing devices and/or combinations of computing devices), without departing from the scope of the invention.

As shown by block 802, method 800 involves receiving societal-consideration data for a plurality of geographic areas over which UAVs are deployable. In one example, the plurality of geographic areas may be a plurality of geographic areas in which service is provided by a fleet of UAVs. By way of example, the plurality of geographic areas may be cells in a grid of cells spanning a city. As another example, the plurality of geographic areas may be different locations in a region where information about a known type of land use is known. For instance, each geographic area may represent an individual public or private property having at least one known type of land use.

As discussed above, in one example, for a given geographic area from the plurality of geographic areas, the societal-consideration data may include one or more land-use indications that are indicative of a type of land use in the geographic area. For instance, each land-use indication may indicate information about the use of land in the geographic area (e.g., what type of use is present or an estimated number of people using the land). Alternatively or additionally, the societal-consideration data may include other types of land-use indications, such as any of the other types of land-use indications disclosed herein.

As shown by block 804, for each of one or more geographic areas of the plurality of geographic areas, a computing device may apply a cost function to one or more land-use indications for the geographic area to determine a societal-consideration of UAV flight over the geographic area. In practice, the computing device may determine the societal-consideration cost for the geographic area by applying a corresponding predetermined weight to each of the one or more land-use indications for the geographic area.

And as shown by block 806, for each of the one or more geographic areas, the computing device may then send an indication of the determined societal-consideration cost to a computer-based flight planner. For instance, the computing device may provide the determined societal-consideration costs for the one or more geographic areas to the flight planner module 714 of FIG. 7.

In some instances, the method 600 may further include determining a flight plan for a particular UAV using the determined societal-consideration costs. For instance, a computer-based flight planner may determine a flight plan between an origin and a destination that minimizes the societal-consideration costs incurred due to UAV flight over the plurality of geographic areas.

Additional details regarding an example implementation of the method 800 are described below, with reference to the conceptual illustrations of FIGS. 9-11.

VIII. CONCEPTUAL ILLUSTRATIONS

FIG. 9 is a table 900 conceptually illustrating example societal-consideration data, according to an example embodiment. As shown in FIG. 9, the societal-consideration data may include a plurality of land-use indications identified using land-use identifications "A" through "N". By way of example, each land-use indication includes a name, location, type, geographic area, and timeframe.

For instance, land-use indication "A", provided in the first row of table 900, is indicative of the presence of an apartment complex in geographic area "1". Additionally, the land-use indication "A" is classified as a permanently dense population. Furthermore, the timeframe for avoidance is indicated as "Always."

As another example, land-use indication "C" is indicative of a use of a sports arena located in geographic area "3". As shown in table 900, a temporary public gathering is planned for the sports arena on the afternoon of a particular day of a particular month.

Table 900 also includes various additional land-use indications occurring in one of geographic areas "1", "2", "3", or "4".

Referring now to FIG. 10, FIG. 10 is a table 1000 conceptually illustrating example societal-consideration costs, according to an example embodiment. In particular, table 800 illustrates the societal-consideration costs of geographic areas "1"-"5" based on the land-use indications identified in table 900 of FIG. 9.

For example, the societal-consideration cost of the first geographic area is shown as "4". The societal-consideration cost is calculated by applying weight "W1" to land-use indications "A" and "H", and by applying weights "W5" and "W6" to land-use indications "L" and "N" respectively. Note that the same weight, "W1", is applied to land-use indications "A" and "H" because both of the land-use indications are of the same type, namely, permanently dense population areas.

Similarly, societal-consideration costs for geographic areas "2" through "5" are shown. Note that the societal-consideration cost of geographic area "5" is indicated to be zero because the societal-consideration data in table 900 did not identify the presence of any land-use indications in geographic area "5".

Furthermore, table 1000 of FIG. 10 also shows a minimum distance that a UAV should maintain between the UAV and other obstacles when flying over each of the geographic areas. For instance, because geographic area "2" has the highest societal-consideration cost, it also has the largest minimum distance of 50 meters.

Note that the example minimum distances of table 1000 are not meant to be limiting. In other examples, if a societal-consideration cost of a geographic area is greater than zero, the minimum distance may be set to a predetermined distance (e.g., 50 meters), rather than having different minimum distances depending on the societal-consideration cost of a particular geographic area.

Figure 11:
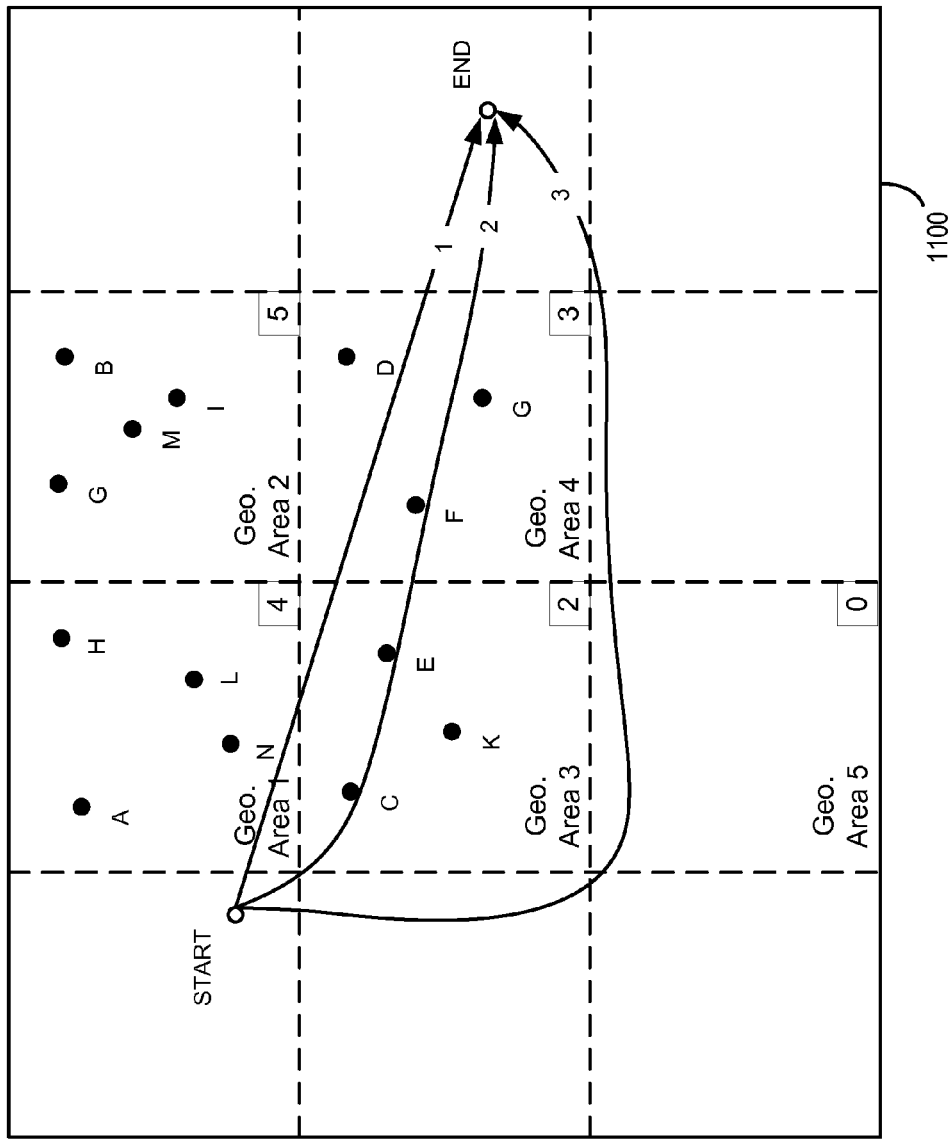
FIG. 11 is a conceptual illustration of example flight plans, according to an example embodiment.

Continuing with the example, FIG. 11 is a conceptual illustration 1100 of example flight plans, according to an example embodiment. As shown in FIG. 11, a region is divided into a plurality of cells, and each cell corresponds to a geographic area. Thus, geographic area "1" is shown occupying a first cell, and the locations of land-use indications "A", "H", "L", and "N" are shown within the first cell. Similarly, additional cells corresponding to geographic areas "2" through "5" are shown in different respective cells. Furthermore, within the bottom right corner of each cell, the societal-consideration cost of the respective geographic area, as calculated in table 1000 of FIG. 10, is shown.

In one instance, a computer-based flight planner may receive a request to determine a flight plan between a starting point "START" and an ending point "END." As discussed above, in some examples, the computer-based flight planner may generate a plurality of different flight plans between the starting point and the ending point. For ease of explanation, only three flight plans "1", "2", and "3" are shown in FIG. 11. In other examples, more than three flight plans may be generated.

Given the societal-consideration costs of the areas over which a UAV following each flight plan would travel, the computer-based flight planner may determine a societal-consideration cost associated with each flight plan. For example, since a UAV following flight plan "1", the most efficient and direct route, would travel through geographic areas "1", "3", and "4", the societal-consideration cost of flight plan "1" may be determined to be "9" (4+2+3=9). Similarly, the societal-consideration cost of flight plan "2" may be determined to be "5", and the societal-consideration cost of flight plan "3" may be determined to be "0".

Consequently, if the computer-based flight planner is configured to return the flight plan that minimizes the societal-consideration costs incurred due to UAV flight, the computer-based flight planner may return flight plan "3". On the other hand, if the computer-based flight plan is configured to return the most efficient flight plan that has a societal-consideration cost less than or equal to "5", the computer-based flight planner may return flight plan "2". This may be the case if the importance measure of the flight plan indicates that a societal-consideration cost of "5" is acceptable, given the criticality of the flight.

Therefore, in some examples, the computer-based flight planner may be configured to determine a flight plan where one or more other costs (e.g., a cost indicative of time, a cost indicative of power-consumed, etc.) is minimized, subject to a constraint on the maximum allowable societal-consideration cost to be incurred.

As discussed above, the conceptual illustrations shown by and described with reference to FIGS. 9 through 11 are provided for purposes of example and are not meant to be limiting. In other embodiments, each of the plurality of geographic areas may represent a single land-use indication. For example, a first geographic area may correspond to the property where a hospital is located, a second geographic area may correspond to the property where a school is located, and a third geographic area may correspond to the property where a single-family home is located. Therefore, the plurality of geographic areas need not be uniformly sized or uniformly distributed.

IX. CONCLUSION

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A computer-implemented method comprising:
receiving societal-consideration data for a plurality of geographic areas over which unmanned aerial vehicles (UAVs) are deployable, wherein, for a given geographic area from the plurality of geographic areas, the societal-consideration data comprises one or more land-use indications that are indicative of a type of land use in the geographic area;
for each of one or more of the plurality of geographic areas:
applying a cost function to the one or more land-use indications for the geographic area to determine a societal-consideration cost of UAV flight over the geographic area;
determining, using a computer-based flight planner, a flight plan for a particular UAV based on the determined societal-consideration costs for the one or more of the plurality of geographic areas; and
providing instructions to a control system that cause the control system to control the particular UAV in accordance with the determined flight plan.

2. The method of claim 1:
wherein the societal-consideration data further comprises a plurality of predetermined weights corresponding to different types of land use; and
wherein applying the cost function to determine the societal-consideration cost comprises applying a predetermined weight corresponding to the type of land use to each of the one or more land-use indications for the geographic area to determine the societal-consideration cost of UAV flight over the geographic area.

3. The method of claim 2, wherein the corresponding predetermined weight applied to at least one of the one or more land-use indications varies based on the time of day.

4. The method of claim 1, wherein the societal-consideration data further comprises a land-use indication that is indicative of at least one geographic area of the plurality of geographic areas having a permanent or temporary population density that is greater than a population threshold.

5. The method of claim 4, wherein the at least one geographic area comprises a location of a temporary public gathering, and wherein the societal-consideration data comprises data received from an event planning database regarding the temporary public gathering.

6. The method of claim 1, wherein the societal-consideration data further comprises a land-use indication that is indicative of personal preferences for land use in at least one geographic area of the plurality of geographic areas.

7. The method of claim 6, wherein the personal preferences for land use comprise user-provided data indicating a request for UAV travel to be constrained for the at least one geographic area.

8. The method of claim 7, wherein the user-provided data is received from a UAV travel-feedback database, wherein the UAV travel-feedback database stores a plurality of user-provided data indicating personal preferences for land use.

9. The method of claim 1, wherein the societal-consideration data comprises semantic data collected from a web mapping service application regarding a plurality of locations where UAV travel should be constrained based on a type of land use at the location, wherein the semantic data for a given location of the plurality of locations identifies the type of land use at the location.

10. The method of claim 1, wherein the flight plan for the particular UAV is further determined based on a predetermined importance measure of the flight plan, wherein the predetermined importance measure is indicative of an acceptable amount of societal-consideration costs to be incurred during flight of the particular UAV.

11. The method of claim 1, wherein the flight plan for the particular UAV is a flight plan that minimizes the societal-consideration costs incurred due to UAV flight.

12. The method of claim 1, wherein the flight plan for the particular UAV indicates, for each of one or more segments of the flight plan, a minimum distance from obstacles for the UAV to maintain during the segment based on a societal-consideration cost for a geographic area that the UAV is configured to travel over during the segment.

13. A non-transitory computer readable medium having stored therein instructions that are executable to cause a computing device to perform functions comprising:
    receiving societal-consideration data for a plurality of geographic areas over which unmanned aerial vehicles (UAVs) are deployable, wherein, for a given geographic area from the plurality of geographic areas, the societal-consideration data comprises one or more land-use indications that are indicative of a type of land use in the geographic area;
    for each of one or more of the plurality of geographic areas: applying a cost function to the one or more land-use indications for the geographic area to determine a societal-consideration cost of UAV flight over the geographic area;
    determining a flight plan for a particular UAV based on the determined societal-consideration costs for the one or more of the plurality of geographic areas; and
    sending instructions to a control system that cause the control system to control the particular UAV in accordance with the determined flight plan.

14. The non-transitory computer readable medium of claim 13:
    wherein the societal-consideration data further comprises a plurality of predetermined weights corresponding to different types of land use; and
    wherein applying the cost function to determine the societal-consideration cost comprises applying a predetermined weight corresponding to the type of land use to each of the one or more land-use indications for the geographic area to determine the societal-consideration cost of UAV flight over the geographic area.

15. The non-transitory computer readable medium of claim 13, wherein the societal-consideration data further comprises a land-use indication that is indicative of at least one geographic area of the plurality of geographic areas having a permanent or temporary population density that is greater than a population threshold.

16. The non-transitory computer readable medium of claim 13, wherein the determined flight plan minimizes the societal-consideration costs incurred due to UAV flight.

17. A computing device, comprising:
    a processor; and
    a computer-readable medium having stored therein instructions that are executable to cause the computing device to perform functions comprising:
        receiving societal-consideration data for a plurality of geographic areas over which unmanned aerial vehicles (UAVs) are deployable, wherein, for a given geographic area from the plurality of geographic areas, the societal-consideration data comprises one or more land-use indications that are indicative of a type of land use in the geographic area;
        for each of one or more of the plurality of geographic areas: applying a cost function to the one or more land-use indications for the geographic area to determine a societal-consideration cost of UAV flight over the geographic area;
        determining a flight plan for a particular UAV based on the determined societal-consideration costs for the one or more of the plurality of geographic areas; and
        sending instructions to a control system that cause the control system to control the particular UAV in accordance with the determined flight plan.

18. The computing device of claim 17:
    wherein the societal-consideration data further comprises a plurality of predetermined weights corresponding to different types of land use; and
    wherein applying the cost function to determine the societal-consideration cost comprises applying a corresponding predetermined weight to each of the one or more land-use indications for the geographic area to determine the societal-consideration cost of UAV flight over the geographic area.

19. The computing device of claim 17, wherein the determined flight plan minimizes the societal-consideration costs incurred due to UAV flight.

* * * * *